United States Patent
Kamata et al.

(10) Patent No.: US 10,220,740 B2
(45) Date of Patent: Mar. 5, 2019

(54) VEHICLE SEAT AND MANUFACTURING METHOD THEREFOR

(71) Applicant: TACHI-S CO., LTD., Tokyo (JP)

(72) Inventors: Hideki Kamata, Tokyo (JP); Ayaru Sasaki, Tokyo (JP)

(73) Assignee: TACHI-S CO., LTD., Tokyo (JP)

(*) Notice: Subject to any disclaimer, the term of this patent is extended or adjusted under 35 U.S.C. 154(b) by 0 days.

(21) Appl. No.: 15/543,167

(22) PCT Filed: Dec. 9, 2015

(86) PCT No.: PCT/JP2015/084564
§ 371 (c)(1),
(2) Date: Jul. 12, 2017

(87) PCT Pub. No.: WO2016/114045
PCT Pub. Date: Jul. 21, 2016

(65) Prior Publication Data
US 2018/0001807 A1    Jan. 4, 2018

(30) Foreign Application Priority Data
Jan. 15, 2015  (JP) ................... 2015/005704

(51) Int. Cl.
*B60N 2/58* (2006.01)
*A47C 31/02* (2006.01)
*B68G 7/052* (2006.01)

(52) U.S. Cl.
CPC ............ *B60N 2/5875* (2013.01); *A47C 31/02* (2013.01); *B60N 2/5891* (2013.01); *B68G 7/052* (2013.01)

(58) Field of Classification Search
CPC .. B60N 2/5875; B60N 2/5891; B60N 2/5883; B68G 7/052; A47C 31/02
(Continued)

(56) References Cited

U.S. PATENT DOCUMENTS 4,534,595 A * 8/1985 Abe .................. B60N 2/5875
                                              297/452.61
4,737,226 A * 4/1988 Inoue .................. B29C 43/18
                                              156/245

(Continued)

FOREIGN PATENT DOCUMENTS

JP    H02200296    *  8/1990
JP    4-253892 A      9/1992
(Continued)

OTHER PUBLICATIONS

International Search Report for PCT/JP2015/084564 dated May 24, 2016; English translation submitted herewith (5 pages).

*Primary Examiner* — Mark R Wendell
(74) *Attorney, Agent, or Firm* — Fitch, Even, Tabin & Flannery, LLP

(57) ABSTRACT

In existing manufacturing methods wherein a bonded seat is formed by adhering a surface skin material to a pad made from molded foam, defects may occur from curing of the adhesive, such as reduced flexibility and a poor texture on the seat contact surface. In addition, the manufacturing steps therefor are complicated. In order to solve the above problems, the present invention provides a manufacturing method for a vehicle seat having a molded pad and a trim cover that covers the molded pad. The molded pad has a groove, and an adhesive is applied to the inside of the groove. The trim cover is pressed into the inside of the groove, and a steam nozzle is inserted into the molded pad from the surface of the molded pad opposite from the surface covered by the trim cover. Heat or steam from the steam nozzle melts the adhesive inside the groove so as to adhere the trim cover to the groove. It is thus possible to provide a vehicle seat and a manufacturing method therefor with (Continued)

which a contact surface can exhibit a good texture and manufacturing steps can be simplified.

7 Claims, 3 Drawing Sheets

(58) Field of Classification Search
USPC .................................................. 297/452.61
See application file for complete search history.

(56) References Cited

U.S. PATENT DOCUMENTS

| 5,016,941 | A | * | 5/1991 | Yokota | ................ B60N 2/5875 297/452.61 |
| 5,372,668 | A | | 12/1994 | Bracesco | |
| 5,395,473 | A | * | 3/1995 | Nixon | .................... B29C 63/22 156/285 |
| 6,371,562 | B1 | * | 4/2002 | Yoshimura | ............ B29C 44/569 156/245 |
| 2003/0047919 | A1 | * | 3/2003 | Fujiwara | ............. B60R 21/2346 280/730.2 |
| 2012/0133194 | A1 | * | 5/2012 | Takehara | ............. A47C 31/023 297/452.58 |
| 2017/0259718 | A1 | * | 9/2017 | Sasaki | ....................... B60N 2/90 |
| 2017/0349429 | A1 | * | 12/2017 | Sasaki | ................... B68G 7/052 |

FOREIGN PATENT DOCUMENTS

| JP | 4-359978 | A | 12/1992 |
| JP | 5-25438 | A | 2/1993 |
| JP | 5-85833 | U | 11/1993 |
| JP | 6-304352 | A | 11/1994 |
| JP | 7-24159 | A | 1/1995 |
| JP | 2994087 | B2 | 12/1999 |
| JP | 2005-58549 | A | 3/2005 |

* cited by examiner

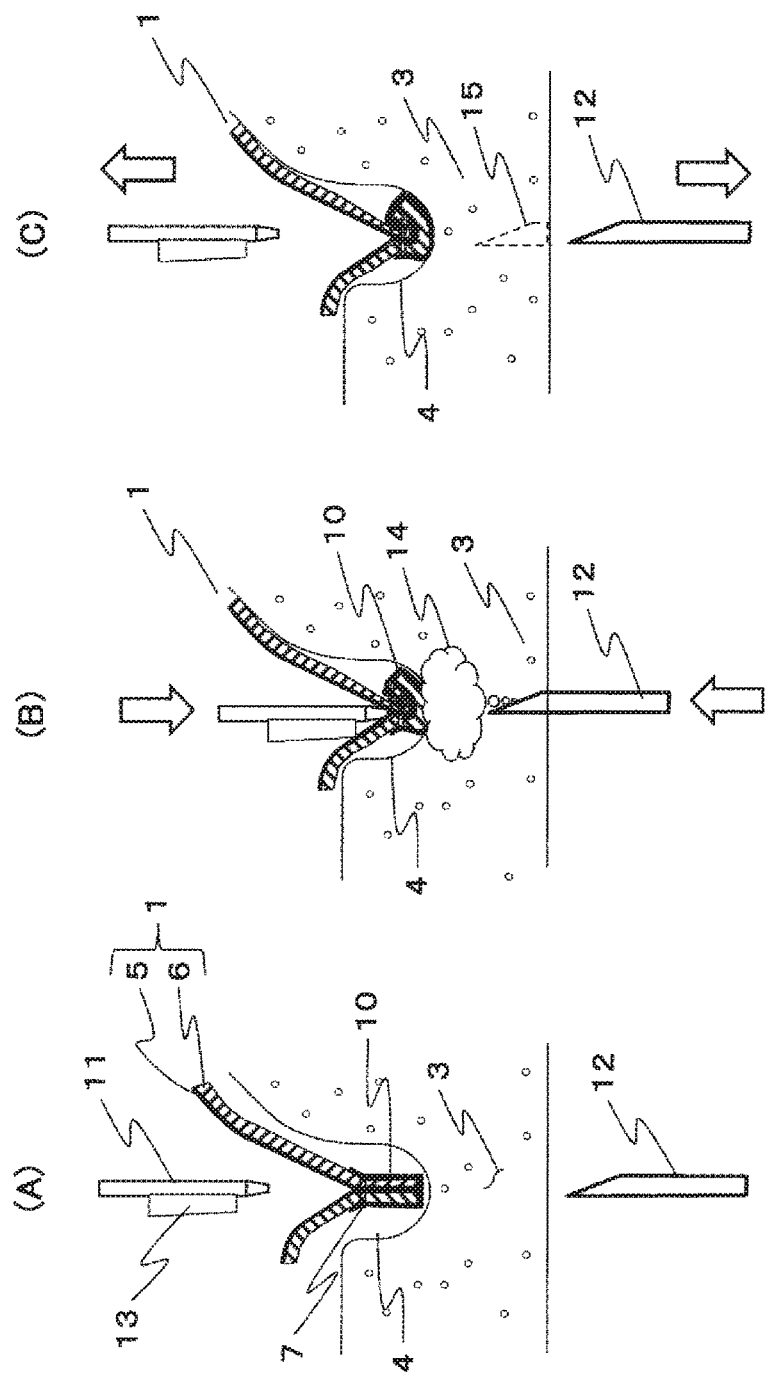

VEHICLE SEAT AND MANUFACTURING METHOD THEREFOR

CROSS-REFERENCE TO RELATED APPLICATIONS

This application is a U.S. national phase application filed under 35 U.S.C. § 371 of International Application No. PCT/JP2015/084564, filed Dec. 9, 2015, designating the United States, which claims priority from Japanese Patent Application No. 2015-005704, filed Jan. 15, 2015, which are hereby incorporated herein by reference in their entirety.

TECHNICAL FIELD

The present invention relates to a vehicle seat, specifically, the method of manufacturing a bond type seat by bonding a surface skin material to a foam pad.

BACKGROUND ART

Generally, the bond type vehicle seat is formed by bonding the surface skin material to the foam pad molded into a substantially seat-like outer shape. Conventionally, the bond type seat is manufactured through the method of applying a liquid adhesive to the molded foam (for example, urethane foam) over an entire seating surface, for example, so that the surface skin material is bonded to the seating surface under pressure. The liquid adhesive is generally sprayed to the pad for application to the entire surface, which may cause the operator on the work place to inhale the sprayed adhesive. The above-described operation generally conducted sealed indoors may also deteriorate workability.

Utility Model Application Publication No. 5-85833 (Patent Literature 1) discloses solution to the above-described problem. Patent Literature 1 discloses the bond type seat manufactured by allowing a mold pad having its surface coated with the hotmelt adhesive, and the seat cover set on the lower mold surface to face each other for lamination, clamping the upper and the lower molds, allowing the respective needles which are arranged on the upper mold, and inserted into the mold pad to jet steam so as to bring the hotmelt adhesive into a molten state for bonding.

Japanese Unexamined Patent Application Publication No. 2005-58549 (Patent Literature 2) as the prior art of the relevant field discloses the process of applying the hotmelt adhesive to the inside of the recess groove formed in the foam pad surface, pressurizing a part of the surface skin material that covers the pad while being intruded inside the recess groove of the pad, and bringing the hotmelt adhesive into the molten state with heated steam from the heater placed at the part corresponding to the recess groove of the pad. Then the surface skin material is bonded to the inside of the recess groove of the pad.

CITATION LIST

Patent Literature

PTL 1: Utility Model Application Publication No. 5-85833
PTL 2: Japanese Unexamined Patent Application Publication No. 2005-58549

SUMMARY OF INVENTION

Technical Problem

According to Patent Literature 1, the surface skin material is bonded to the entire seating surface of the pad with the adhesive, which deteriorates flexibility owing to curing of the adhesive, thus causing disadvantage of degraded texture on the seating surface of the seat.

Meanwhile, according to Patent Literature 2, the surface skin material is bonded only to the inside of the recess groove of the pad, while having the other part unbonded to the pad. This may prevent deterioration in flexibility owing to curing of the adhesive, solving the disadvantage of degraded texture on the seating surface of the seat. However, the steam is applied to the front surface of the surface skin material, which may cause disadvantages of, for example, causing water to stain the surface skin material, generating the film which obstructs bonding to deteriorate the bonding performance, and the like.

It is an object of the present invention to eliminate the disadvantages conventionally occurred in the generally employed bond type seat as described above.

Solution to Problem

The claimed structure may be employed to solve the above-described problem. The present invention includes a plurality of means for solving the problem. For example, a method of manufacturing a vehicle seat having a mold pad with a groove, and a trim cover for covering the mold pad includes the steps of applying an adhesive to the inside of the groove, pushing the trim cover to the inside of the groove, inserting a steam nozzle into the mold pad from its surface opposite the surface covered with the trim cover, and bringing the adhesive inside the groove into a molten state through heat or steam from the steam nozzle for bonding the trim cover to the groove.

Advantageous Effects of Invention

The present invention is capable of providing the vehicle seat with the contact surface exhibiting good texture, which is configured to simplify manufacturing steps, and further providing the method of manufacturing the vehicle seat.

BRIEF DESCRIPTION OF DRAWINGS

FIGS. 5(A), 5(B) and 5(C) are explanatory views representing the method of bonding a trim cover to the groove according to the embodiment.

DESCRIPTION OF EMBODIMENT

Figure 1:
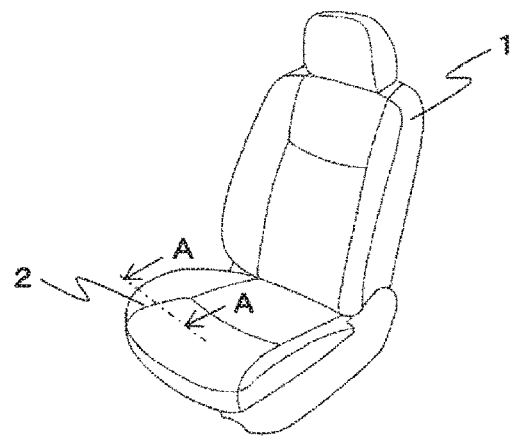
FIG. 1 is an outside appearance view of a seat back of a vehicle seat according to an embodiment.

An embodiment of the present invention will be described referring to the drawings.

First Embodiment

Figure 2:
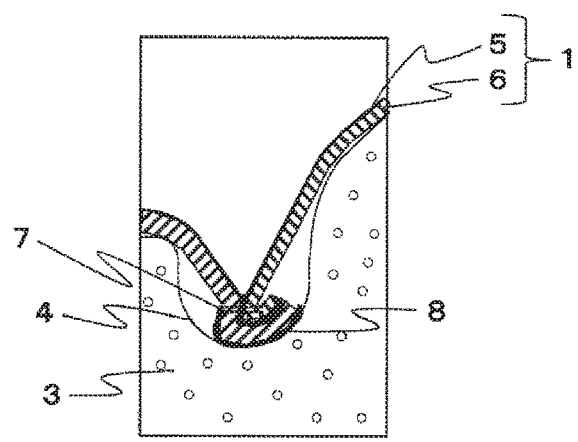
FIG. 2 is a fragmentary sectional view of FIG. 1.

FIG. 1 is an outside appearance view of a seat back of the vehicle seat according to an embodiment. Referring to FIG. 1, the seat back is covered with a trim cover 1 formed as a sewn seat-shaped cover. A number 2 designates a design groove for improving design properties. FIG. 2 is a sectional view taken along line A-A of FIG. 1. Referring to FIG. 2, a number 3 designates a mold pad as a molded foam pad. Numbers 4, 5, 6 designate a groove formed in the mold pad 3 for constituting the design groove 2, a surface skin material, and a wadding such as urethane, respectively. The surface skin material 5 and the wadding 6 constitute the trim cover 1. The trim cover is formed by connecting a plurality of surface skin materials and the waddings. A number 7 designates a sewn part for connecting the surface skin material and the wadding. An adhesive 8 is applied to the inside of the groove 4, by which the sewn part 7 pushed to the inside of the groove 4 is bonded thereto.

Figure 3:
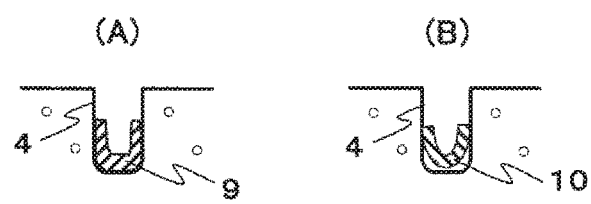
FIGS. 3(A) and 3(B) are explanatory views representing an exemplary method of applying the adhesive to the inside of a groove according to the embodiment.

FIG. 3 is a sectional view of the groove of the mold pad, explaining the method of applying the adhesive to the inside of the groove 4. For example, FIG. 3A represents the method of pouring an adhesive 9 to the inside of the groove 4, and FIG. 3B represents the method of pushing a sheet adhesive 10 so as to be temporarily set to the inside of the groove 4. Those methods allow application of the adhesive only to the inside of the groove so that the trim cover 1 is bonded only to the inside of the groove 4 of the mold pad 3 without being bonded to any other part. This makes it possible to solve the disadvantage of deteriorated texture on the seat contact surface as a result of reduced flexibility of the trim cover owing to curing of the adhesive.

Figure 4:
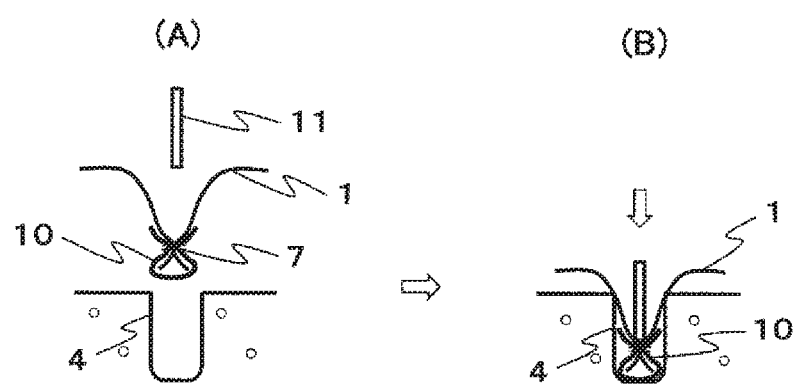
FIGS. 4(A) and 4(B) are explanatory views representing another exemplary method of applying the adhesive to the inside of the groove according to the embodiment.

FIG. 4 is an explanatory view representing another exemplary method of applying the adhesive to the inside of the groove 4. Referring to FIG. 4A, the sheet adhesive 10 is sewn simultaneously with sewing of the trim cover 1. Referring to FIG. 4B, the sewn part 7 is pushed to the inside of the groove 4 by a pushing plate 11 so as to allow positioning of the sheet adhesive 10 to the inside of the groove 4 while preventing dislocation. This allows such part as the groove to be partially bonded while having any other part unbonded.

The method of sewing the sheet adhesive 10 simultaneously with sewing of the trim cover 1 is effective in reducing the process steps of pouring the adhesive into the groove, and pushing the sheet adhesive into the groove in addition to the effect derived from the method as shown in FIG. 3. In the case of using the hotmelt sheet adhesive in consideration of workability as shown in FIG. 3B, the adhesive in the temporary set state may possibly be dislocated without being fixed before it is bonded in heating. The method as shown in FIG. 4 is capable of solving the above-described problem.

FIG. 5 is an explanatory view representing the method of bonding the trim cover to the groove according to the embodiment. FIG. 5 represents the bonding of the trim cover to the inside of the groove through the process of sewing the sheet adhesive simultaneously with sewing of the trim cover as shown in FIG. 4.

Referring to FIG. 5A, the sheet adhesive 10 as the hotmelt sheet adhesive constitutes the sewn part 7 that is sewn simultaneously with sewing of the trim cover 1. Referring to FIG. 5B, the sewn part 7 of the trim cover 1 is pushed to the inside of the groove 4 of the mold pad 3 using the pushing plate 11. Thereafter, a steam nozzle 12 is inserted into the mold pad 3 for jetting steam 14. The sheet adhesive 10 inside the groove 4 is brought into a molten state by the steam 14 or in the heated state. Then the sheet adhesive 10 is cooled and solidified so that the trim cover 1 is bonded to the inside of the groove 4. Suction of air from the steam nozzle 12 may be conducted to facilitate cooling and solidification of the sheet adhesive 10. FIG. 5C represents the state that the sheet adhesive 10 is cooled and solidified so that the trim cover 1 is bonded to the inside of the groove 4. Referring to FIG. 5C, the steam nozzle 12 that is no longer required to jet the steam is pulled out from the mold pad 3. As a result, a hole 15 is remained as a trace generated through insertion of the steam nozzle 12.

The sheet adhesive is sewn simultaneously with sewing of the trim cover 1. The adhesive in the molten state makes it difficult to locate the trace at which the sheet adhesive has been sewn. However, the sewing is conducted using the sewing thread in the state that the sheet adhesive is applied onto the trim cover. Therefore, it is possible to determine that the sheet adhesive has been sewn so long as at least the adhesive intrudes into the part between the trim cover and the sewing thread, and the adhesive by the amount corresponding to the thickness of the sheet adhesive is remained.

For example, a felt as a reinforcing member is bonded to the surface of the mold pad 3 at the side where the steam nozzle 12 is inserted. Because of low heat conductivity of the felted part, a hole through which the steam nozzle 12 is inserted is formed in the part. As the mold pad 3 is likely to conduct heat, it is effective to hold the tip end of the steam nozzle 12 at the position lower than the deepest part of the groove 4 so as to widely spread the steam therefrom.

Jetting of the steam through the steam nozzles 12 at predetermined intervals along the groove 4 makes it possible to uniformly bond the trim cover to the groove.

Referring to FIG. 5A, a number 13 designates an air nozzle which may be used to aid in pushing the sewn part 7 of the trim cover 1 to the inside of the groove 4 of the mold pad 3 in supply of air from the air nozzle 13.

Compared with another generally employed method of reproducing the design groove by fixing the hanging member sewn to the trim cover to the insert wire set for the mold pad with the O-ring and the like, the method according to the embodiment employs no insert wire nor the hanging member. This ensures improved comfortableness and feeling performance of the seat, thinning of the mold pad, weight reduction, and material cost reduction. Furthermore, as the working with the O-ring is not required, it is effective for suppressing dispersion in quality and reducing machining costs.

The explanation has been made with respect to the method of bonding the trim cover to the groove, which is implemented on the assumption that the sheet adhesive is sewn simultaneously with sewing of the trim cover. It is also applicable to the method of pouring the adhesive to the inside of the groove, or the method of pushing the sheet adhesive so as to be temporarily set to the inside of the groove as shown in FIG. 3.

The seat back of the vehicle seat has been described as above. It is to be clearly understood that the invention is applicable to any other part of the vehicle seat except the seat back upon bonding of the trim cover to the groove.

The explanation has been made with respect to the trim cover constituted by the surface skin material and the wadding, which is not limited thereto. For example, the surface skin material which covers the mold pad may be used as the trim cover.

The above-described embodiment is the method of manufacturing a vehicle seat having a mold pad with a groove, and a trim cover for covering the mold pad. The method includes the steps of applying an adhesive to the inside of the groove, pushing the trim cover to the inside of the groove, inserting a steam nozzle into the mold pad from its surface opposite the surface covered with the trim cover, and bringing the adhesive inside the groove into a molten state through heat or steam from the steam nozzle for bonding the trim cover to the groove.

Application of the adhesive to the inside of the groove is conducted by pouring the adhesive into the groove, or pushing the sheet adhesive so as to be temporarily set to the inside of the groove.

Application of the adhesive to the inside of the groove is conducted by sewing the sheet adhesive simultaneously with sewing of the trim cover to constitute the sewn part so as to be pushed to the inside of the groove instead of pushing the trim cover.

The vehicle sheet includes a mold pad, and a trim cover for covering the mold pad. The mold pad has a groove. The trim cover is bonded to the inside of the groove. A plurality of holes are formed along the groove in a surface of the mold pad, which is opposite a surface covered with the trim cover.

The embodiment ensures to provide the vehicle seat which exhibits good texture on the contact surface, and simplifies the manufacturing steps, and the manufacturing method of the vehicle seat.

The explanation has been made, taking the embodiment as an example. It is to be understood that the present invention is not limited to the embodiment as described above, but includes various modifications. The embodiment is described in detail for readily understanding of the present invention which is not necessarily limited to the one equipped with all structures as described above. It is also possible to replace a part of the structure of the embodiment with another structure.

LIST OF REFERENCE SIGNS

1: trim cover,
2: design groove,
3: mold pad,
4: groove,
5: surface skin material,
6: wadding,
7: sewn part,
8, 9: adhesive,
10: sheet adhesive,
11: pushing plate,
12: steam nozzle,
13: air nozzle,
14: steam,
15: hole

The invention claimed is:

1. A method of manufacturing a vehicle seat having a mold pad, and a trim cover for covering the mold pad, the mold pad having a groove, the method comprising the steps of:
sewing a sheet adhesive to the trim cover simultaneously with sewing of the trim cover to constitute a sewn part;
pushing the sewn part to the inside of the groove using a pushing plate and air from an air nozzle;
inserting a steam nozzle into the mold pad from a surface of the mold pad opposite the surface covered with the trim cover, wherein a tip of the steam nozzle is kept at a position spaced from the inside of the groove;
bringing the sheet adhesive inside the groove into a molten state through heat or steam from the steam nozzle; and then
cooling and solidifying of the sheet adhesive by suction of air from the steam nozzle, whereby the trim cover is bonded to the inside of the groove by cooling and solidification of the sheet adhesive.

2. The method of manufacturing a vehicle seat according to claim 1, wherein the sheet adhesive is of hotmelt type.

3. The method of manufacturing a vehicle seat according to claim 1, wherein:
the steam nozzles are inserted into the mold pad at predetermined intervals along the groove; and
the sheet adhesive inside the groove is brought into a molten state so that the trim cover is bonded to the groove.

4. A vehicle seat comprising:
a mold pad; and
a trim cover for covering the mold pad, wherein:
the mold pad has a groove;
the trim cover has a sewn part made by sewing an adhesive sheet to the trim cover simultaneously with sewing of the trim cover;
the sewn part is pushed to the inside of the groove
the trim cover is bonded only to the inside of the groove with the adhesive of the adhesive sheet; and
a plurality of non-through holes are formed along the groove in a surface of the mold pad, which is opposite a surface covered with the trim cover, wherein the non-through holes are spaced from the inside of the groove.

5. The vehicle seat according to claim 4, wherein each of the plurality of non-through holes serves as an insertion hole for a heating nozzle which brings the adhesive into a molten state for bonding the trim cover to the inside of the groove.

6. The vehicle seat according to claim 5, wherein the adhesive of the adhesive sheet intrudes into a part between the trim cover and sewing thread used for sewing the adhesive sheet to the trim cover simultaneously with sewing of the trim cover.

7. The vehicle seat according to claim 4, wherein the adhesive of the adhesive sheet intrudes into a part between the trim cover and sewing thread used for sewing the adhesive sheet to the trim cover simultaneously with sewing of the trim cover.

* * * * *